(12) United States Patent
Gabrys

(10) Patent No.: US 6,707,187 B1
(45) Date of Patent: Mar. 16, 2004

(54) FLYWHEEL SYSTEM WITH TILT SWITCH

(75) Inventor: Christopher W. Gabrys, Reno, NV (US)

(73) Assignee: Indigo Energy, Inc., Napa, CA (US)

( * ) Notice: Subject to any disclaimer, the term of this patent is extended or adjusted under 35 U.S.C. 154(b) by 20 days.

(21) Appl. No.: 10/037,823

(22) Filed: Nov. 9, 2001

Related U.S. Application Data

(60) Provisional application No. 60/247,360, filed on Nov. 10, 2000.

(51) Int. Cl.[7] .................................................. H02K 7/02
(52) U.S. Cl. ............................ 310/74; 310/90.5; 74/572
(58) Field of Search ................................ 310/90.5, 68 A, 310/74, 153; 74/572, 574

(56) References Cited

U.S. PATENT DOCUMENTS

| | | | |
|---|---|---|---|
| 4,444,444 A | 4/1984 | Benedetti et al. ............ 308/10 |
| 5,112,126 A | * 5/1992 | Graevner ..................... 356/152 |
| 5,905,321 A | 5/1999 | Clifton et al. ............... 310/174 |
| 5,925,952 A | * 7/1999 | Bichler et al. ................ 310/74 |
| 5,945,754 A | 8/1999 | Fulwood et al. .............. 310/74 |
| 5,969,446 A | 10/1999 | Eisenhaure et al. ........... 310/74 |
| 5,998,899 A | * 12/1999 | Rosen et al. ................. 310/90.5 |
| 6,089,511 A | * 7/2000 | Resmusson ................... 244/172 |
| 6,121,704 A | * 9/2000 | Fukuyama et al. .......... 310/90.5 |
| 6,172,435 B1 | 1/2001 | Tanaka ......................... 310/74 |
| 6,191,513 B1 | * 2/2001 | Chen et al. .................... 310/90 |
| 6,262,505 B1 | * 7/2001 | Hockney et al. ............ 310/90.5 |
| 6,307,295 B1 | * 10/2001 | Murabe et al. .............. 310/90.5 |
| 6,388,347 B1 | * 5/2002 | Blake et al. .................. 310/74 |

* cited by examiner

Primary Examiner—Thomas M. Dougherty
Assistant Examiner—Leda T. Pham
(74) Attorney, Agent, or Firm—J. Michael Neary

(57) ABSTRACT

A flywheel energy storage system includes an energy storage flywheel supported on a bearing system for rotation about a substantially vertical axis inside in an evacuated chamber enclosed within a sealed container. A motor and a generator accelerates and decelerates the flywheel for storing and retrieving energy. A tilt sensor detects if the orientation of the axis of rotation is outside of tolerance limits from vertical and triggers a signal to signal appropriate system functions to protect the system from damage.

16 Claims, 5 Drawing Sheets

FLYWHEEL SYSTEM WITH TILT SWITCH

This relates to U.S. Provisional Application 60/247,360 filed on Nov. 10, 2000.

This invention pertains to flywheel energy storage systems and more particularly to a safety mechanism for flywheel systems that use a tilt switch to protect the system from damage by halting operation if not oriented sufficiently close to vertical. Depending on the type of bearings employed in the flywheel energy storage system, the invention can prevent system damage from overloading of the bearings, non-centered operation or greatly shortened bearing life from excessive bearing loads.

BACKGROUND OF THE INVENTION

Flywheels have emerged as a very attractive energy storage technology for such electrical applications as uninterruptible power supplies, utility load leveling systems, and alternative energy generation. Flywheel systems convert back and forth between the rotational energy of a spinning flywheel and electrical energy. A flywheel energy storage system includes a flywheel, a motor and generator, a bearing system and a vacuum enclosure. The rotating flywheel stores the energy mechanically; the motor and generator converts between electrical and mechanical while the bearing system physically supports the rotating flywheel. High-speed flywheels are normally contained in a vacuum or low-pressure enclosure to minimize aerodynamic losses that would occur from atmospheric operation.

Some of the benefits of flywheel energy storage systems over conventional batteries are longer life and higher reliability. A key component to achieving long life with flywheel energy storage systems is the bearing system. Flywheels have been supported by numerous configurations of bearings that have included magnetic, mechanical and fluid type. No matter which bearing system method is used, the orientation of the flywheel system with respect to gravity alters its performance. In most designs, it is preferable to orient the axis of rotation of the flywheel as close to vertical as possible to insure proper operation. In this configuration, the weight of the flywheel is supported axially. As the orientation of the axis of rotation is tilted with respect to vertical, the radial component of the load exerted on the bearings increases, increasing the risk that the radial load capability of the bearings be exceeded, causing them to not carry the load in the case of magnetic bearings, or shorten the bearing's life in the case of mechanical bearings. Besides increasing bearing loads or shortening system life, an excessively tilted system can cause unexpected operating conditions. Systems using long shafts can experience unanticipated increased radial deflections. Such deflection can cause component clearances to be less than designed and also lead to failures due to metal fatigue and other factors.

In many cases, flywheel energy storage systems are installed below ground for safety. Whether below ground or above ground, the chance for improper installation or a change in the system orientation to occur over time exists. Continued operation of a flywheel system that is oriented too far from vertical can greatly shorten the life of the system and potentially can cause dangerous failures to occur.

SUMMARY OF THE INVENTION

Accordingly, the invention provides detection and a warning signal in the event of operation outside a predetermined tolerance from vertical orientation of a flywheel energy storage system having a flywheel supported for rotation about a vertical axis using a bearing system, and an attached motor/generator that accelerates and decelerates the flywheel for storing and retrieving energy. To prevent excessive radial loading of the flywheel bearings, a tilt sensor is included in the flywheel system that detects if the orientation of the axis of rotation is beyond off-vertical tolerance. The tilt sensor acts as a safety mechanism and can generate a signal for corrective action, including activating alarms or slowing or stopping operation of an improper tilted-axis orientation of the system. Operating flywheel systems with a tilt angle that exceeds the design of the bearing system can drastically reduce the bearing life and can potentially lead to failures. Despite the best intentions of engineers and those responsible for installation, incorrect installation of flywheel systems may occur from time to time. Earthquakes, ground shifts and technician installation errors are all potential causes for an unacceptably tilted flywheel system. These occurrences may go undetected and unrepaired. In several embodiments of the invention, the tilt sensor generates signals that trigger remote or unit alarms, disconnect power to the motor, or discharge the flywheel energy storage system.

DESCRIPTION OF THE DRAWINGS

The invention will become better understood upon reading the following detailed description of the preferred embodiments in conjunction with the drawings, wherein.

DESCRIPTION OF THE PREFERRED EMBODIMENTS

Figure 1:
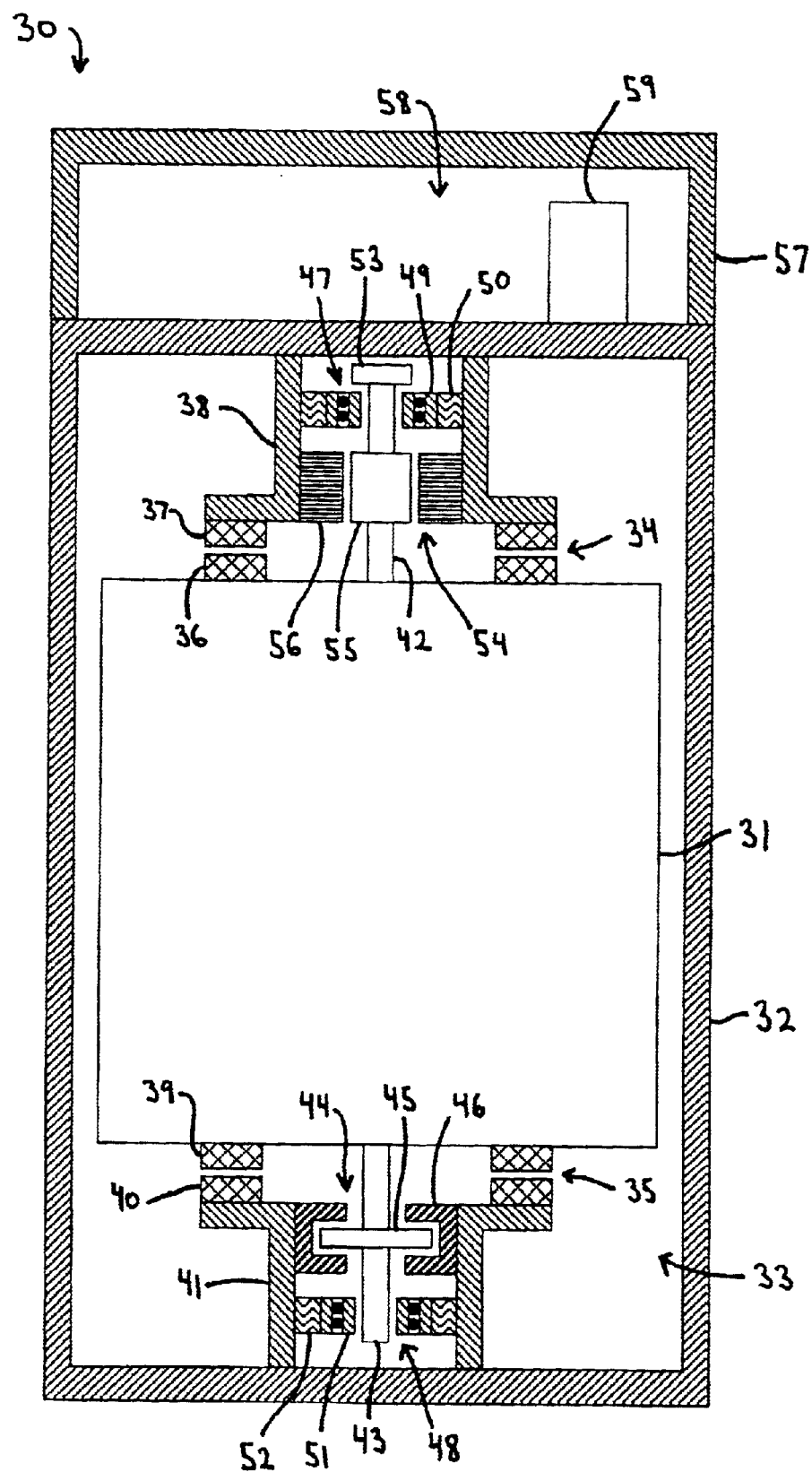
FIG. 1 is a schematic drawing of a flywheel energy storage system in accordance with the invention.

Turning now to the drawings, wherein like reference characters designate identical or corresponding parts, and more particularly to FIG. 1 thereof, a preferred embodiment of a flywheel energy storage system 30 with a tilt sensor in accordance with the invention is shown having a high strength flywheel 31 that is enclosed in an evacuated chamber 33 within a sealed container 32. The low-pressure atmosphere or vacuum inside the chamber 33 reduces aerodynamic losses caused by drag on the flywheel 31, but for low speed flywheels it is possible to use an atmosphere of a small molecule gas such as helium to reduce drag. The flywheel 31 can be constructed as a solid metal flywheel, as shown, composite rim flywheel or of other constructions well known in the art.

The flywheel 31 is supported for rotation about a vertical axis of rotation on upper and lower passive radial magnetic bearings 34 and 35. Passive radial magnetic bearings are desirable for use with flywheel systems because they provide radial centering force without requiring active control. Only a single axial control, which can have much lower frequency response, is all that is required for stable levitation. The upper passive radial magnetic bearing 34 may be comprised of a ring magnet 36 attached to the flywheel 31 that is acted upon by a similar stationery ring magnet 37 attached to the upper stator structure 38. Likewise, the lower magnetic bearing 35 is similarly comprised of a ring magnet 39 attached to the flywheel 31 that cooperates with a stationery ring magnet 40 attached to the lower stator structure 41. The rotating ring magnets 36, 39 are preferably reinforced to handle the stresses from high speed rotation and the rings 36, 39 can be further constructed of multiple individual arc segments to limit stresses and facilitate manufacturing. Many types of passive radial magnetic bearings exist and could be used in accordance with the invention.

The passive radial magnetic bearings 34, 35 can also provide axial support of the weight of the flywheel 31 if properly designed. The flywheel 31 has upper and lower shafts 42 and 43. To provide further axial support and to axially stabilize the flywheel 31, an active axial magnetic thrust bearing 44 is attached to the lower shaft 43. The active thrust bearing 44 is comprised of thrust disk 45 that is attached to the flywheel shaft 43 and is acted upon by a surrounding active magnetic thrust bearing stator 46. A position sensor, not shown, can be used to provide axial position feedback and control.

Other types of active magnetic thrust bearings could also be used. For example, a bearing like that disclosed in my U.S. Patent Application No. XXXXX entitled "Active Magnetic Thrust Bearing" filed on Nov. 2, 2001, the disclosure of which is incorporated herein by reference, could be used.

To prevent excessive displacements of the flywheel 31 during transportation or operation, upper and lower auxiliary bearings 47 and 48 are provided. The auxiliary bearings 47, 48 are comprised of ball bearing sets 49, 51 that are mounted to upper and lower stator structures 38, 41 using spring dampers 50 and 52. An axial stop 53 is attached to the flywheel shaft 42 to limit excessive axial displacement. The flywheel system 30 stores and retrieves energy by use of a motor/generator 54 comprised of a rotor 55 that is attached to the upper shaft 42 and surrounded by a motor/generator stator 56. Many designs of motors and generators could be used with the invention including separate motors and generators and integrated flywheel-rotors. Use of motor/generators with low negative radial stiffness can allow for more tilting of the system, as the passive radial magnetic bearings do not have to fight the negative stiffness from the motor/generator.

Although passive radial magnetic bearings have the benefits of simplicity and reliability, in many cases they are capable of generating only a very low radial stiffness and hence have a low radial load carrying capability. Use of more permanent magnets can increase the radial stiffness but this results in undesirable increased costs. The radial stiffness is generally very low, typically in the range of 500–2000 lb/in for many flywheel systems. Because of the low radial stiffness, the orientation of the axis of rotation becomes important. Tilting the system causes the weight of the flywheel to exert radial loading to the bearings. If the system is oriented at more than 2–10 degrees from vertical, depending on the system design, the flywheel can exceed the maximum allowable radial displacement on the magnetic bearings. In this case, the flywheel 31 contacts mechanical touchdown bearings 47, 48 that are usually only designed to operate for a short period of time. The flywheel system 30 thus would be prone to early failure and knowledge of the pending failure from improper operation may not be known. To prevent failure, a tilt sensor 59 is included with the flywheel energy storage system 30. The tilt sensor 59 can be located at any convenient place in the flywheel system, however one preferable position is to locate it in a separate chamber 57 having an internal compartment 58 that is at atmospheric pressure. The separate chamber 57 is useful for placement of electronics or making electrical connections, both not shown, to the evacuated chamber 32. The tilt sensor 59 detects when the orientation of the axis of rotation of the flywheel 31 is too far from vertical. The tilt sensor 59 can function by triggering when the allowable tilt angle is exceeded or alternatively by detecting if the tilt angle off the axis of rotation is acceptable or not. Common tilt sensors like conductive liquid types, ball types, or variable sensor types can be used. However, use of a pendulum type tilt sensor with a built-in switch is preferable for its simplicity. One tilt sensor and switch can be used if it detects tilting in multiple directions or alternatively, multiple tilt sensors could be used together.

Figure 2:
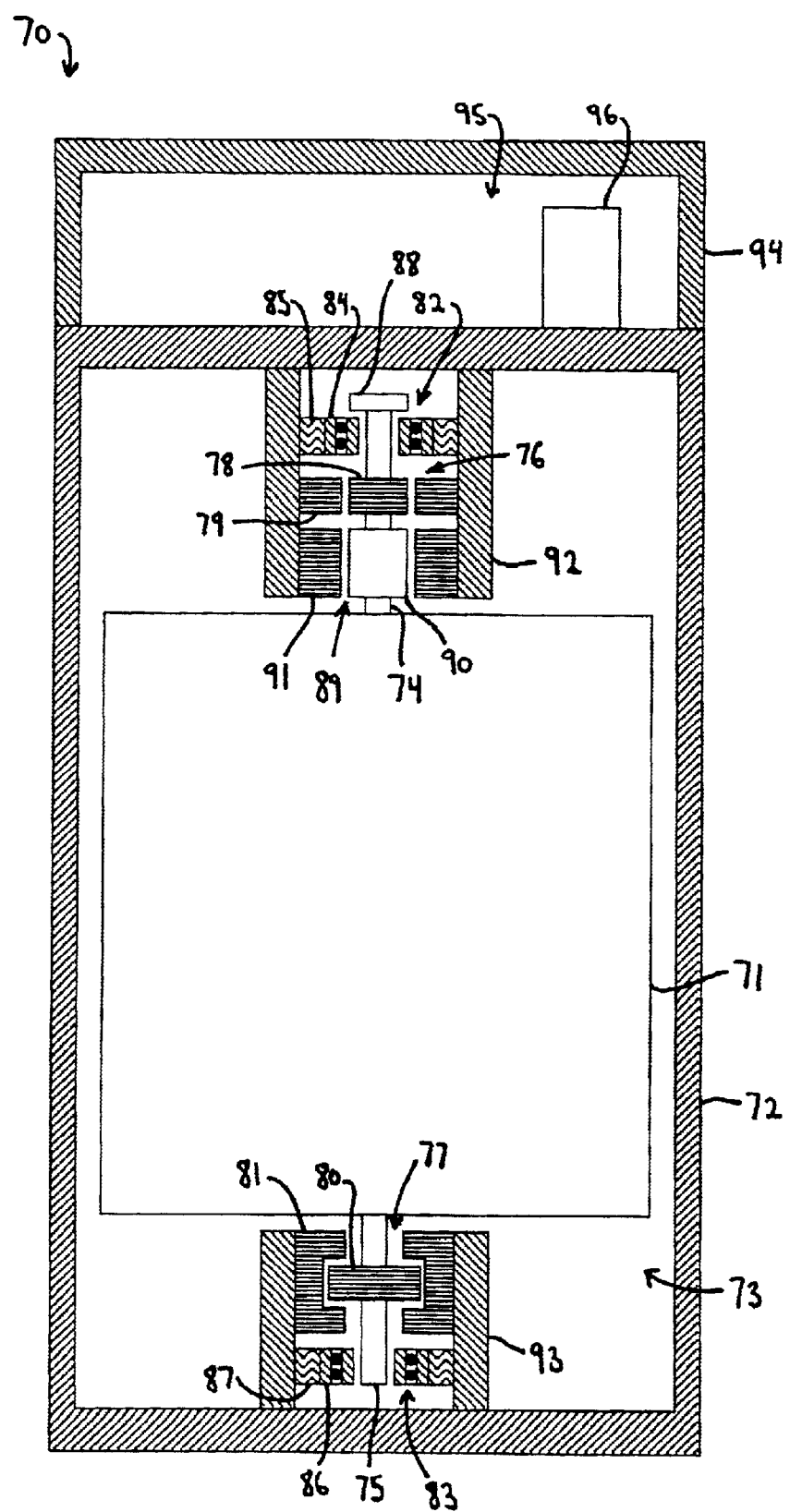
FIG. 2 is a schematic drawing of an alternate configuration flywheel energy storage system in accordance with the invention.

The invention is useful not only with flywheels supported by passive radial magnetic bearings, but other types of bearings as well. An alternate embodiment of the invention employing active radial magnetic bearings is shown in FIG. 2. The flywheel system 70 is comprised of a flywheel 71 that rotates inside an evacuated chamber 73 enclosed within a container 72. The flywheel 71 has upper and lower shafts 74 and 75 and is supported for rotation about a vertical axis on upper and lower active magnetic bearings 76 and 77. The upper active magnetic bearing 76 is a radial type and uses a magnetic bearing rotor 78 attached to the upper shaft 74. An active radial bearing stator 79 surrounds the rotor 78 and provides radial control forces to support the flywheel 71 radially. Radial position sensors, not shown, provide feedback for control. The lower magnetic bearing 77 is a combined radial and axial thrust type. The magnetic bearing 77 is comprised of a bearing rotor 80 that is surrounded by the combination active bearing stator 81. Position sensors, not shown, provide feedback for control of the lower active bearing 77. Many configurations using active radial magnetic bearings can be conceived and employed in accordance with the invention.

To limit excessive displacements, upper and lower auxiliary bearings 82 and 83 are included. The auxiliary bearings 82, 83 are comprised of rolling-element bearing sets 84 and 86 that are supported using spring dampers 85 and 87. Different types of mounts or bushings could alternatively be used. An axial stop 88 attached to the flywheel shaft 74 limits axial displacement and two stops can be used to prevent axial displacement in both directions if desired.

The flywheel 71 is accelerated and decelerated for storing and retrieving energy with a motor/generator 89. The motor generator 89 is comprised of a motor/generator rotor 90 attached to the flywheel shaft 74 that is surrounded by the motor/generator stator 91. Brushless type motor/generators are preferred for long life while permanent magnet designs have an added advantage of high efficiency. Reluctance or alternator type designs can also be employed which allow simple generator voltage regulation using field coil power. Upper and lower stator structures 92 and 93 support the upper and lower magnetic bearings 76 and 77 and the motor/generator 89.

Active magnetic bearings can usually generate higher radial stiffnesses than passive radial magnetic bearings because of the active control. However, despite capability of having a higher radial stiffness, active magnetic bearings have a finite radial load capacity based on their design. For low cost and low power radial magnetic bearings that also use low cost and low power amplifiers for control, the maximum rated load capacity can still be small and in some cases less than 25 lbs. Limiting the radial load on the active radial magnetic bearings can also increase the life of the control amplifiers. The flywheel energy storage system 70 therefore includes a tilt sensor 96. The tilt sensor 96 is located in an upper compartment 94, which is left at atmospheric pressure. Placement of the tilt sensor 96 at any location in the flywheel system 70 that allows it to detect deviation of the flywheel axis of rotation from vertical would also be acceptable.

Figure 3:
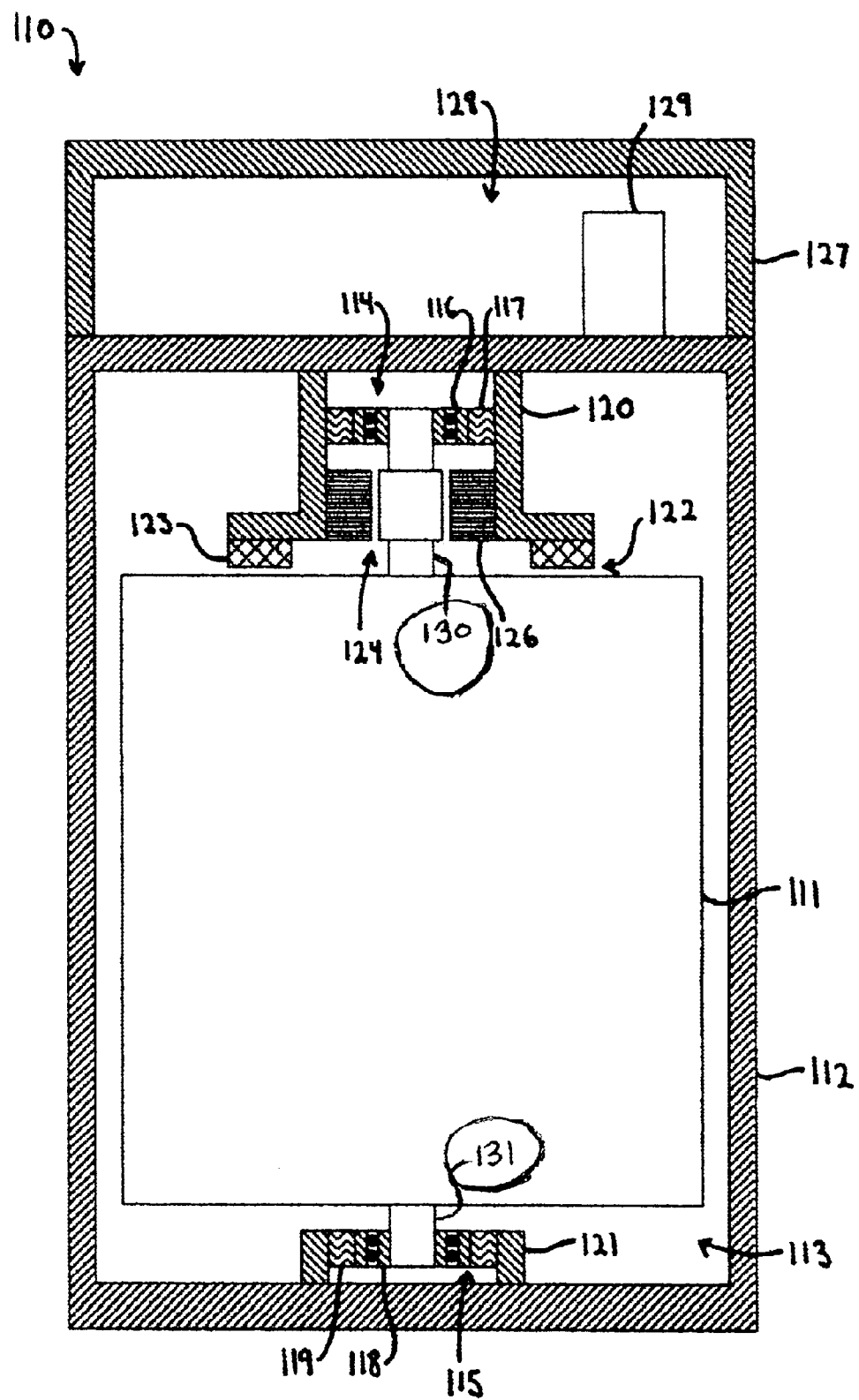
FIG. 3 is a schematic drawing of a second alternate configuration flywheel energy storage system in accordance with the invention.

The invention is also applicable for use in flywheel systems that use mechanical bearings for support of the flywheel. A second alternate flywheel system 110 in accordance with the invention, shown in FIG. 3, has an energy storage flywheel 111 in an evacuated chamber 113 within a sealed container 112. The flywheel 111 is supported for rotation about a vertical axis on upper and lower mechanical bearings 114 and 115. The upper and lower flywheel shafts 130 and 131 rotate inside ball bearing sets 116 and 118 which are supported by upper and lower stator structures 120 and 121 through use of bearing mounts 117 and 119. Roller or other types of mechanical bearings could be used instead. Because the life of ball bearings is generally a cubic function of the load, it is very desirable to reduce the load that the upper and lower bearings 114 and 115 must carry. An axial magnetic bearing 122 is therefore used to carry a majority of the weight of the flywheel 111. The magnetic bearing 122 is comprised of a stationery ring magnet 123 that attracts the flywheel 111 upward. Other designs of axial magnetic thrust bearings could be used instead, including active ones. Even with the elimination of essentially all or most of the axial loading from the mechanical bearings, increased radial loading can still be very detrimental and dramatically shorten the life of the bearings 116, 118. For example, with a flywheel weighing 300 lbs and having an axis of rotation tilted at 1 degree, the radial loading per bearing is approximately 2.6 lbs. If the tilt angle is increased to 5 degrees, the radial loading increases to 13 pounds. Because bearing fatigue life is approximately a cubic function of the load, the life of the bearings is reduced by a factor of 125. A higher amount of bearing heat can also result, which may be difficult to dissipate in a vacuum. Therefore, it is preferable to maintain the flywheel system with only a small tilt angle, preferably less than 10 degrees and more preferably less than 5 degrees. Use of larger bearings to carry larger radial loading from a large tilt angle with long life is not always possible because the speed capability of larger bearings to prevent operation To prevent excessive mechanical bearing loading and a shortened operating life, the flywheel system 10 employs a tilt switch 129. The tilt switch 129 is located in an upper chamber 127 left at atmospheric pressure 128.

Figure 4:
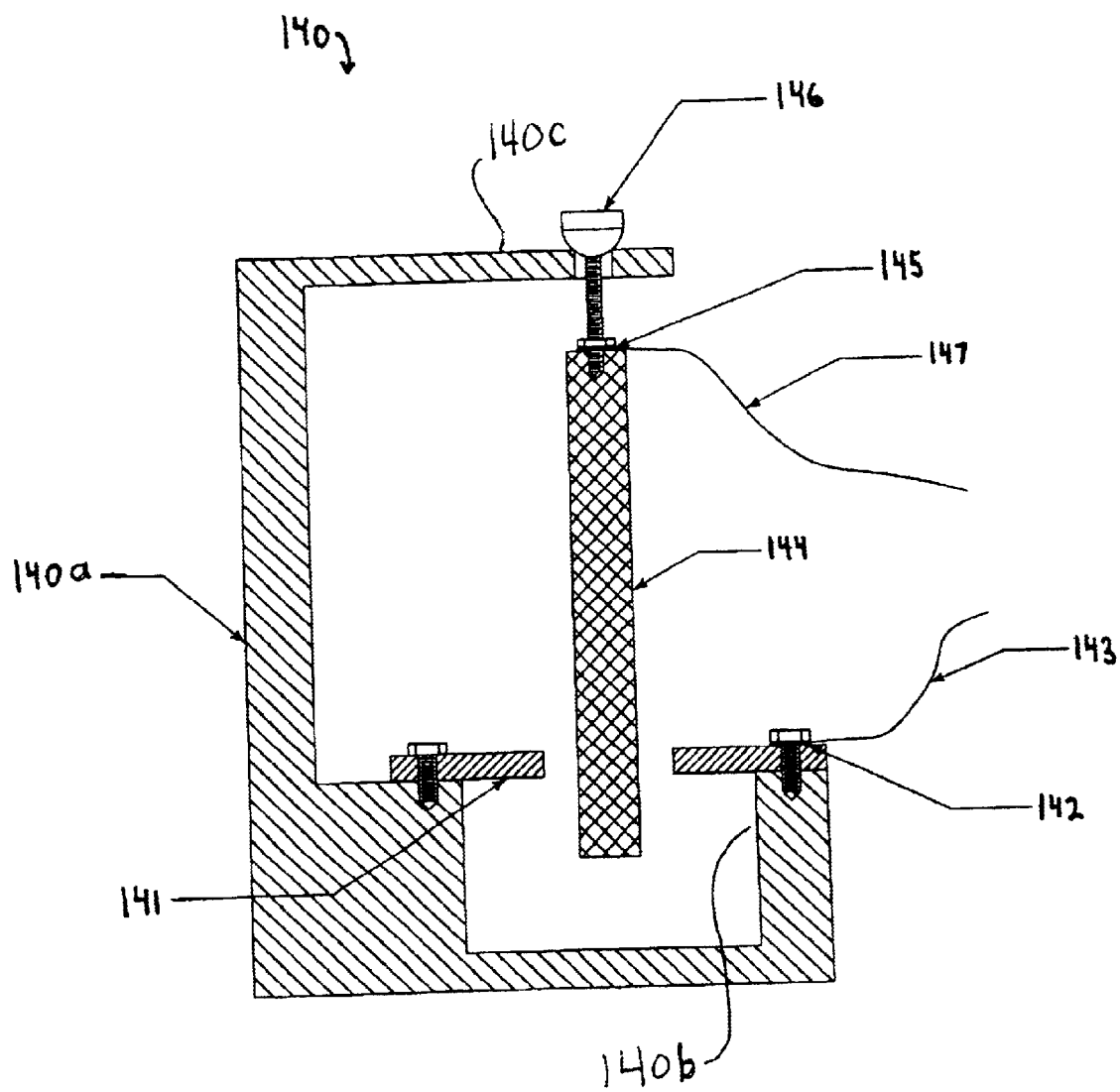
FIG. 4 is a schematic drawing of a pendulum tilt switch in accordance with the invention.

Many designs of tilt sensors can be used with the invention. One preferable design for simplicity, reliability and low cost is a combination pendulum tilt sensor and switch 140, shown in FIG. 4. The tilt sensor and switch 140 is comprised of a base 140a preferably constructed from non-conducting material such as plastic. A metal washer 141 is secured over the top of a well or recess 140b in the base 140 a using screws 142 or other fastening means. The washer 141 is preferably made of a material that is electrically conducting and low corroding. The washer 141 can be constructed from copper. An electrical connection wire 143 is connected to the washer 141 through use of the securing screws 142 or by soldering or the like. The tilt sensor/switch 140 functions using the swing of a pendulum 144 to detect excessive tilt angles. The pendulum 144 is hung from an arm 140c overhanging the well 140b on a bolt 145 and spherical head nut 146 that allows pivoting of the pendulum 144. The bolt 145 also attaches a second connection wire 147, which could also be attached at the head nut 146. When the flywheel system, and hence the sensor/switch 140, is tilted too far, the pendulum 144 contacts the washer 141 competing a connection between the wires 143 and 147. As stated previously, other types of tilt switches could be used, and more than one switch for individually detecting tilt in different directions or for detecting more than one level of tilt could be used.

Figure 5:
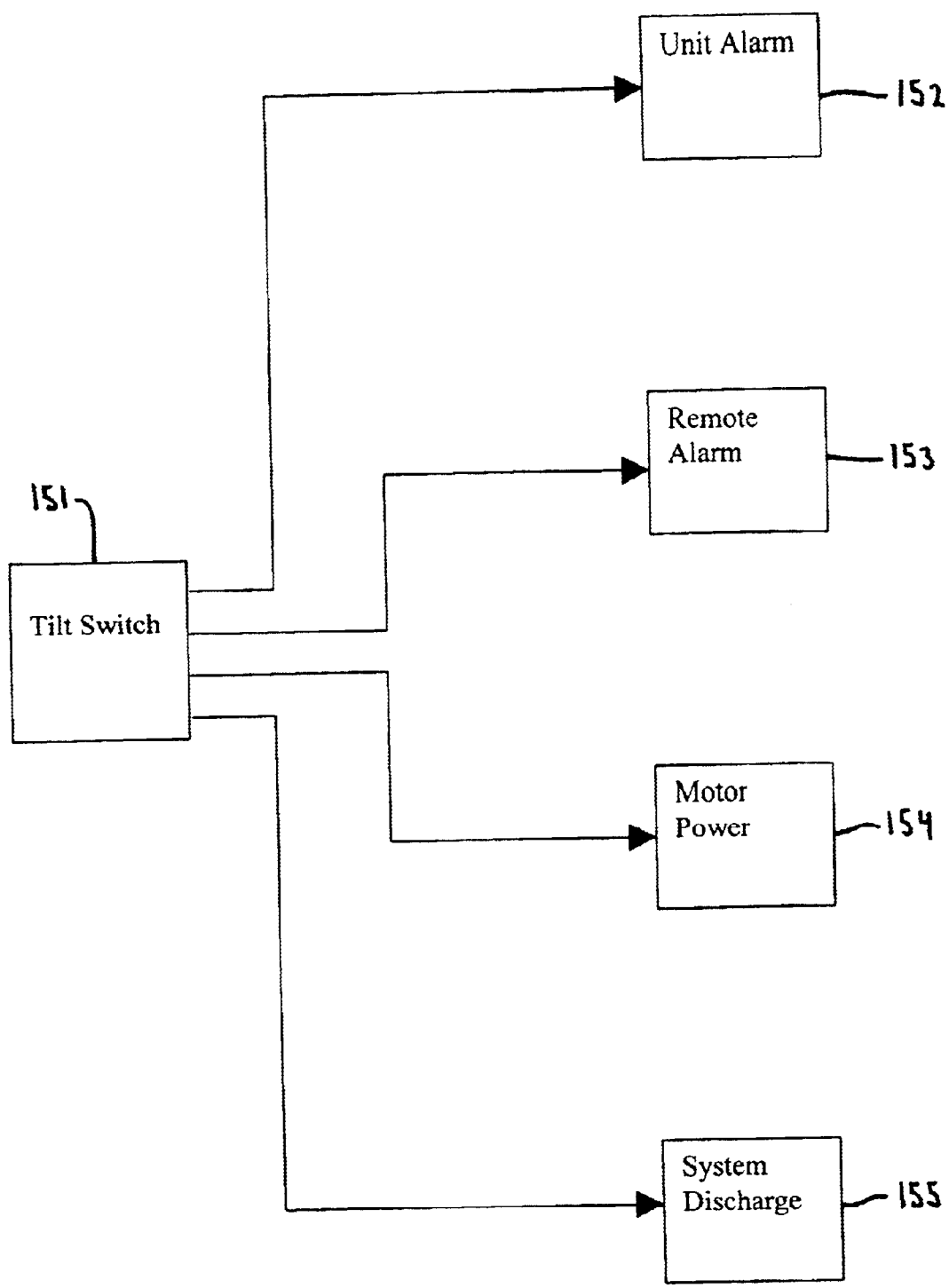
FIG. 5 is a schematic diagram showing possible outcomes of tilt switch operation in accordance with the invention.

When the tilt sensor 140 detects that the flywheel system is tilted beyond a predetermined tolerance from vertical, or determines that the tilt level is acceptable, the flywheel system can generate a signal that triggers one or more of several different corrective actions. A diagram showing possible outcomes of tilt sensor signal activation in accordance with the invention is shown in FIG. 5. The triggering of the tilt sensor 151 can activate a unit alarm 152 at the site of the flywheel system or also a remote alarm 153 that would occur at a different location. Other possibilities also include preventing motor power 154 from charging the flywheel system or triggering a discharge system 155 to discharge the stored energy through a resistive load. The tilt sensor 151 can be directly wired to the outcomes 152–155 or it is also possible to have a latching mechanism, not shown, that latches if the system is tilted once when powered. The tilt sensor 151 can also be effective in detecting earthquakes as well as system tilt and can cause appropriate action include an alarm to signal inspection of the flywheel system.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof are to be considered within the spirit and scope of the invention as defined in the following claims, wherein I claim:

What is claimed is:

1. A flywheel energy storage system, comprising:
    an energy storage flywheel supported on a bearing system for rotation about a substantially vertical axis inside a container with an internal low friction atmosphere, a motor and a generator for accelerating and decelerating said flywheel for storing and retrieving energy; and
    a tilt sensor that detects if the orientation of the axis of said bearing system for said flywheel is outside a predetermined tolerance from the direction of gravity, and produces a signal to trigger predetermined corrective actions.

2. A flywheel energy storage system as described in claim 1, wherein:
    said bearing system is comprised of magnetic bearings.

3. A flywheel energy storage system as described in claim 2 wherein:
    said magnetic bearings provide passive radial centering force to said flywheel.

4. A flywheel energy storage system as described in claim 2 wherein:

said magnetic bearings use active radial control.

5. A flywheel energy storage system as described in claim 1 wherein:

said bearing system is comprised of a combination of magnetic and mechanical bearings.

6. A flywheel energy storage system as described in claim 5 wherein:

said magnetic bearings are used to provide axial lift force to the flywheel and said mechanical bearings provide radial centering force.

7. A flywheel energy storage system as described in claim 1, wherein:

said tilt sensor detects excessive tilting of said flywheel energy storage system when the axis of rotation of said flywheel is more than 10 degrees from vertical.

8. A flywheel energy storage system as described in claim 1 wherein:

said tilt sensor detects excessive tilting of said flywheel energy storage system when the axis of rotation of said flywheel is more than 5 degree from vertical.

9. A flywheel energy storage system as described in claim 1 wherein:

said tilt sensor includes an mechanical switch.

10. A flywheel energy storage system as described in claim 9 wherein:

said mechanical switch uses a pendulum.

11. A flywheel energy storage system as described in claim 10 wherein:

said tilt sensor includes a pendulum hanging inside an opening in an annular electrical contact;

whereby said pendulum contacts said annular electrical contact and completes an electrical circuit to generate said signal when said flywheel energy storage system tilts beyond said predetermined tolerance from vertical.

12. A flywheel energy storage system as described in claim 1 wherein:

said tilt sensor detects whether the orientation of the axis of rotation of said flywheel is inside of outside of tolerance from vertical by detecting the tilt angle of the axis of said bearing system for said flywheel.

13. A flywheel energy storage system as described in claim 12 wherein:

detection of the orientation of the axis of rotation of said flywheel being too far from vertical causes an alarm within said flywheel energy storage system.

14. A flywheel energy storage system as described in claim 12 wherein:

detection of the orientation of the axis of rotation of said flywheel being too far from vertical causes a remote alarm.

15. A flywheel energy storage system as described in claim 12 wherein:

detection of the orientation of the axis of rotation of said flywheel being too far from vertical causes prevention of power application to said motor.

16. A flywheel energy storage system as described in claim 12 wherein:

detection of the orientation of the axis of rotation of said flywheel being too far from vertical causes said flywheel energy storage system to discharge.

* * * * *